(12) United States Patent
Peng et al.

(10) Patent No.: US 9,025,289 B1
(45) Date of Patent: May 5, 2015

(54) LOW-COST ELECTROSTATIC DISCHARGE (ESD) PROTECTION DEVICE FOR HIGH-VOLTAGE OPEN-DRAIN PAD

(71) Applicant: Amazing Microelectronic Corp., New Taipei (TW)

(72) Inventors: James Jeng-Jie Peng, Taoyuan County (TW); Chih-Hao Chen, Taipei (TW); Ryan Hsin-Chin Jiang, Taipei (TW)

(73) Assignee: Amazing Microelectronic Corp., New Taipei (TW)

( * ) Notice: Subject to any disclaimer, the term of this patent is extended or adjusted under 35 U.S.C. 154(b) by 0 days.

(21) Appl. No.: 14/104,506

(22) Filed: Dec. 12, 2013

(51) Int. Cl.
| H02H 9/00 | (2006.01) |
| H02H 3/02 | (2006.01) |
| H02H 3/20 | (2006.01) |
| H02H 1/04 | (2006.01) |
| H02H 3/22 | (2006.01) |
| H02H 9/06 | (2006.01) |

(52) U.S. Cl.
CPC .. *H02H 3/02* (2013.01); *H02H 3/20* (2013.01)

(58) Field of Classification Search
USPC .......................................................... 361/56
See application file for complete search history.

(56) References Cited

U.S. PATENT DOCUMENTS

| 6,356,063 | B1 | 3/2002 | Brooks | |
| 7,518,841 | B2* | 4/2009 | Chuang et al. | 361/56 |
| 2006/0103998 | A1* | 5/2006 | Smith | 361/91.1 |
| 2009/0213508 | A1 | 8/2009 | Hsihe et al. | |
| 2013/0114172 | A1* | 5/2013 | Huang et al. | 361/56 |
| 2014/0139963 | A1* | 5/2014 | Stockinger | 361/111 |

FOREIGN PATENT DOCUMENTS

| TW | I242875 | 3/1993 |
| TW | I278094 | 12/1994 |
| TW | 96121406 | 6/1996 |
| TW | 200937707 | 9/2009 |

OTHER PUBLICATIONS

Ming-Dou Ker; Cheng-Cheng Yen; Pi-Chia Shih; On-Chip Transient Detection Circuit for System-Level ESD Protection in CMOS Integrated Circuits to Meet Electromagnetic Compatibility Regulation.

* cited by examiner

*Primary Examiner* — Dharti Patel
(74) *Attorney, Agent, or Firm* — Rosenberg, Klein & Lee

(57) ABSTRACT

A low-cost ESD protection device for high-voltage open-drain pad is disclosed, which has a first high-voltage (HV) NMOSFET coupled to a high-voltage (HV) open drain pad, a ground pad, a HV block unit and an ESD clamp unit and a low-voltage (LV) bias unit coupled to the first HV NMOSFET, a low-voltage (LV) trigger, the ESD clamp unit and the ground pad. The LV trigger is coupled to the HV block unit. The HV block unit blocks a high voltage from the HV open drain pad diode during normal operation and generates a trigger signal to the LV trigger when an ESD event is applied to the HV open drain pad. Then, the LV trigger turns on the ESD clamp unit to discharge an ESD current and switches the LV bias unit to turn off the first HV NMOSFET.

7 Claims, 4 Drawing Sheets

LOW-COST ELECTROSTATIC DISCHARGE (ESD) PROTECTION DEVICE FOR HIGH-VOLTAGE OPEN-DRAIN PAD

BACKGROUND OF THE INVENTION

1. Field of the Invention

The present invention relates to a protection design, particularly to a low-cost electrostatic discharge (ESD) protection device for high-voltage open-drain pad.

2. Description of the Related Art

The open-drain I/O cell design is used for the application that the external voltage applied on the I/O pad is higher than the internal supply voltage of the I/O cell library. For a high-voltage (HV) open-drain buffer, it does not contain a high-voltage p-channel metal oxide semiconductor field effect transistor (HV PMOSFET, also known as HV PMOS) device connected to the core power line, so that the I/O pads can sustain a voltage higher than the supply voltage. Therefore, it is difficult to have a good ESD protection capability for an open-drain buffer.

Refer to FIG. 1, the conventional multiple channel high voltage open-drain buffer uses the ESD bus to reduce the size of the open-drain buffer for ESD protection. Since every open-drain channel shares the same ESD clamp element 10 to release the ESD current, the turn-on time for the multiple channels are different, which results in non-uniform ESD currents released. The ESD protection capability is improved by the HV trigger circuit 12 to efficiently trigger on the ESD clamp element 10 when an ESD event appears on the open-drain I/O pad, as shown in FIG. 2. The HV trigger circuit 12 is generally composed of a resistor, a capacitor, and a HV inverter. The HV inverter includes a HV PMOS and a high-voltage n-channel metal oxide semiconductor field effect transistor (HV NMOSFET, also known as HV NMOS). When an ESD event occurs, the HV trigger circuit 12 fully turns on the ESD clamp element 10 to provide a lower impedance ESD discharging path to bypass the ESD current. However, the original open-drain I/O cell does not include a HV PMOS. Therefore, the mask layer number will be increased by taking an additional HV PMOS of the HV inverter, which means that the cost of the IC fabrication process is increased.

To overcome the abovementioned problems, the present invention provides a new HV open-drain ESD protection design, so as to solve the abovementioned problems of the prior art.

SUMMARY OF THE INVENTION

A primary objective of the present invention is to provide an electrostatic discharge (ESD) protection device for high-voltage open-drain pad, which installs a high-voltage (HV) block unit between a high-voltage (HV) open drain pad and a low-voltage (LV) trigger. The HV block unit not only blocks a high voltage supply applied on the high-voltage pad in normal operation but also bypasses an ESD current when an ESD event occurs. A low-voltage (LV) bias unit is used to turn off an open drain high-voltage N-channel metal oxide semiconductor field effect transistor (HV NMOSFET) lest the ESD current damage the HV NMOSFET. The open-drain ESD protection device includes only a high-voltage n-channel metal oxide semiconductor field effect transistor (HV NMOSFET, also known as HV NMOS), and no extra mask layer is needed (without any additional high-voltage p-channel metal oxide semiconductor field effect transistor, HV PMOSFET, also known as HV PMOS), thereby achieving low cost requirement.

To achieve the abovementioned objectives, the present invention provides a low-cost ESD protection device for high-voltage open-drain pad, which comprises a first high-voltage N-channel metal oxide semiconductor field effect transistor (HV NMOSFET) coupled to a high-voltage (HV) open drain pad and a low-voltage (LV) ground pad. A diode is coupled to the HV open drain pad, the first HV NMOSFET, a high-voltage (HV) block unit and an electrostatic discharge (ESD) clamp unit, wherein the diode is used for multi-channel open drain application to share the same ESD clamp unit. The diode is coupled to a HV block unit and an ESD clamp unit, and the HV block unit is coupled to a low-voltage (LV) trigger. The LV trigger and the ESD clamp unit are coupled to a low-voltage (LV) bias unit and the LV ground pad. The LV bias unit is coupled to the first HV NMOSFET. During normal operation, the LV trigger unit, the LV bias unit and the ESD clamp unit are disabled, and the HV block unit blocks a high voltage from the diode. When an ESD event is applied to the HV open drain pad, the HV block unit generates a trigger signal to the LV trigger, and then the LV trigger turns on the ESD clamp unit to discharge an ESD current and switches the LV bias unit to turn off the first HV NMOSFET. Besides, the diode is removed in single channel application Below, the embodiments are described in detail in cooperation with the drawings to make easily understood the technical contents, characteristics and accomplishments of the present invention.

DETAILED DESCRIPTION OF THE INVENTION

Figure 1:
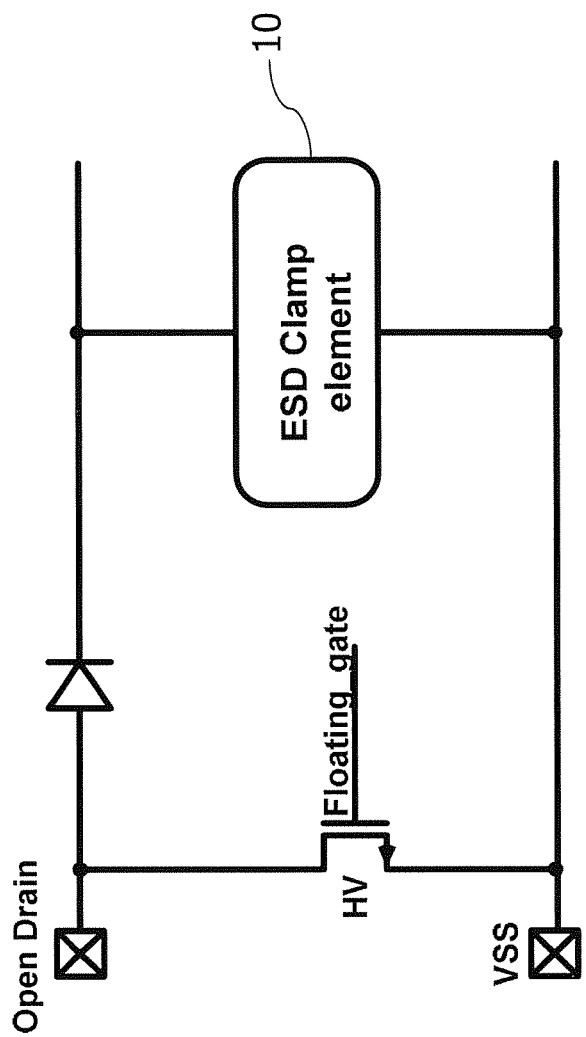
FIG. 1 is a circuit diagram schematically showing a conventional high voltage open-drain buffer.
Figure 2:
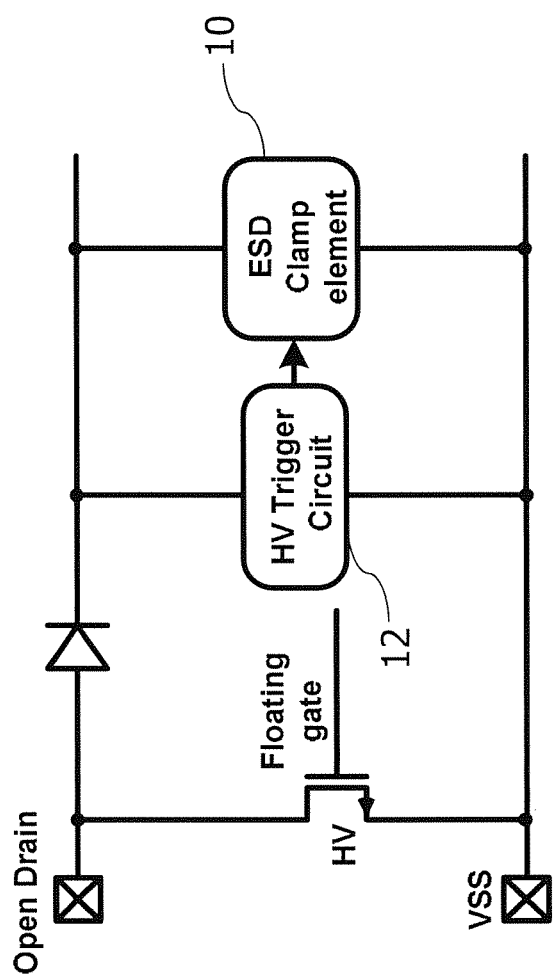
FIG. 2 is a circuit diagram schematically showing a conventional high voltage open-drain buffer with a high-voltage trigger circuit.
Figure 3:
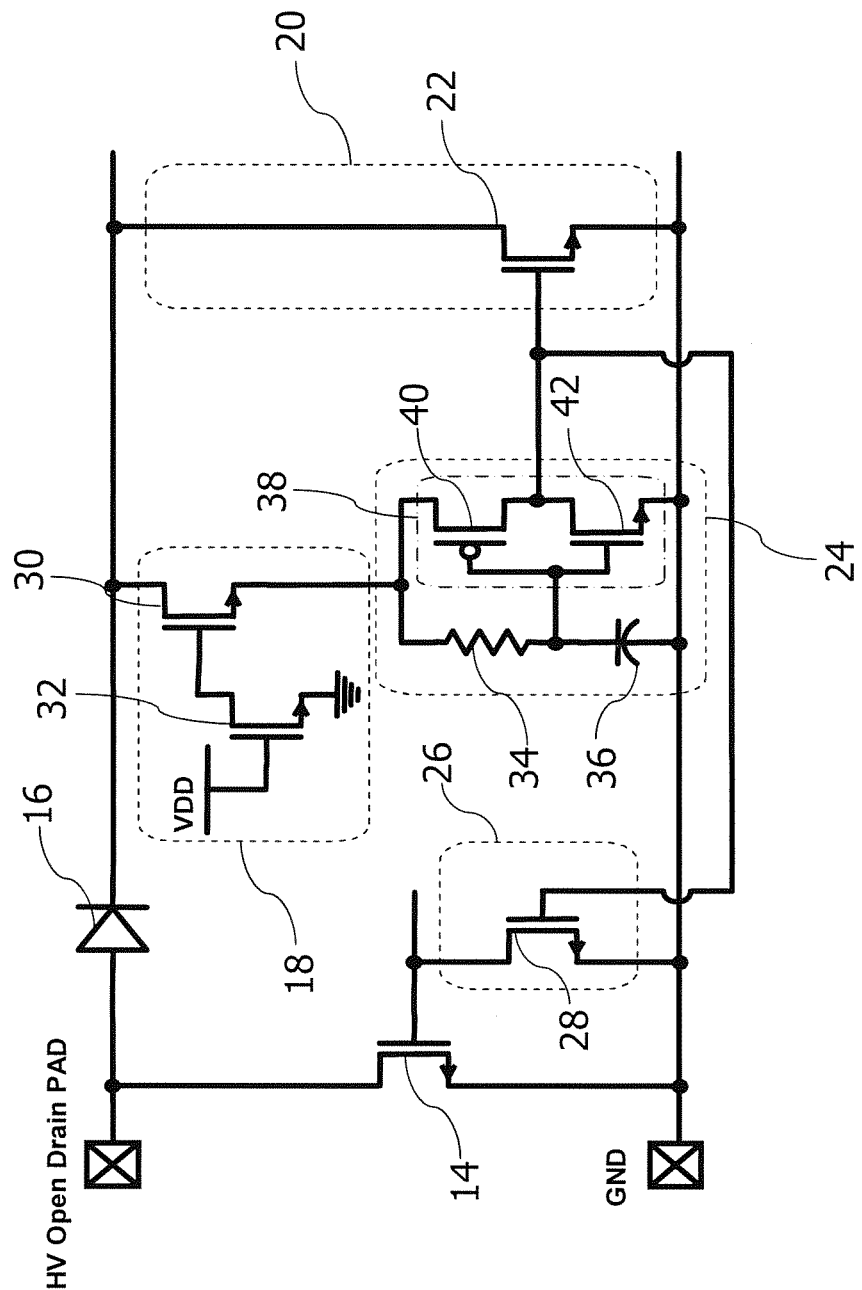
FIG. 3 is a circuit diagram schematically showing a high voltage open drain electrostatic discharge (ESD) protection device according to the first embodiment of the present invention.

Refer to FIG. 3. The first embodiment of the present invention is described as below. The present invention comprises a first high-voltage N-channel metal oxide semiconductor field effect transistor (HV NMOSFET) 14 coupled to a high-voltage (HV) open drain pad and a low-voltage (LV) ground pad GND. In normal operation, a driving circuit coupled to a gate of the first HV NMOSFET 14 can turn on or off the first HV NMOSFET 14, so that the first HV NMOSFET 14 receives a high voltage on the HV open drain pad to operate. When an ESD event is applied to the HV open drain pad, the gate of the first HV NMOSFET 14 is turned off by a LV bias unit 26. An anode of a diode 16 is coupled to the HV open drain pad and the first HV NMOSFET 14, and a cathode of the diode 16 is coupled to a high-voltage (HV) block unit 18 and an electrostatic discharge (ESD) clamp unit 20, wherein the ESD clamp unit is exemplified by a high-voltage N-channel metal oxide semiconductor field effect transistor (HV NMOSFET) 22. In the first embodiment, the diode 16 is used for multi-channel open drain application to share the same ESD clamp unit 20. The HV block unit 18 is coupled to a low-voltage (LV) trigger 24. The LV trigger 24 and the ESD clamp unit 20 are coupled to the LV bias unit 26 and the LV ground pad GND. The LV bias unit 26 is exemplified by a low-voltage N-channel metal oxide semiconductor field oxide transistor (LV NMOSFET) 28. The LV bias unit 26 is coupled to the gate of the first HV NMOSFET 14. During normal operation, the LV trigger unit 24, the LV bias unit 26 and the ESD clamp unit 20 are disabled, and the HV block unit 18 blocks a high voltage from the diode 16. When the ESD event is applied to the HV open drain pad, the HV block unit 18 generates a trigger signal to the LV trigger 24, and then the LV trigger 24 turns on the ESD clamp unit 20 to discharge an ESD current and switches the LV bias unit 26 to turn off the first HV NMOSFET 14.

The HV block unit 18 further comprises a second HV NMOSFET 30 and a low-voltage N-channel metal oxide semiconductor field oxide transistor (LV NMOSFET) 32. A drain of the second HV NMOSFET 30 is coupled to the ESD clamp unit 20, the first HV NMOSFET 14 and the HV open drain pad, and a source the of second HV NMOSFET 30 is coupled to the LV trigger 24. A gate, a source and a drain of the LV NMOSFET 32 are respectively coupled to a power-supply terminal VDD, a ground and a gate of the second HV NMOSFET 30. The second HV NMOSFET 30 has a parasitic drain-to-gate capacitor between the drain and the gate of the second HV NMOSFET 30. The LV NMOSFET 32 turns off the second HV NMOSFET 30 by a voltage of the power-supply terminal VDD during the normal operation, so as to block the high voltage from diode 16. When the ESD event occurs on the HV open drain pad, the LV NMOSFET 32 and the parasitic drain-to-gate capacitor turn on the second HV NMOSFET 30 by receiving an ESD signal of the ESD event.

The LV trigger 24 further comprises a resistor 34, a capacitor 36 and an inverter 38. The resistor 34 has a first terminal and a second terminal, and the first terminal is coupled to the source of the second HV NMOSFET 30 of the HV block unit 18. The capacitor 36 has a first electrode and a second electrode, wherein the first electrode and the second electrode are respectively coupled to the second terminal and the LV ground pad GND. The capacitor 36 receives the trigger signal through the resistor 34 to establish a low voltage signal at the first electrode when the ESD event is applied to the HV open drain pad. The inverter 38 is coupled to the first terminal, the second terminal, the first electrode, the second electrode, the source of the second HV NMOSFET 30 of the HV block unit 18, the LV ground pad GND, the ESD clamp unit 20 and the LV bias unit 26, and receives the low voltage signal to turn on the ESD clamp unit 20 and switch the LV bias unit 26 to turn off the first HV NMOSFET 14.

The inverter 38 further comprises a low-voltage P-channel metal oxide semiconductor field oxide transistor (LV PMOSFET) 40 and a low-voltage N-channel metal oxide semiconductor field oxide transistor (LV NMOSFET) 42. The LV PMOSFET 40 has a gate coupled to the second terminal and the first electrode, and a source coupled to the first terminal and the source of the second HV NMOSFET 30 of the HV block unit 18. The LV NMOSFET 42 has a gate coupled to the second terminal and the first electrode, a source coupled to the second electrode, the ESD clamp unit 20, and the LV ground pad GND, and a drain coupled to a drain of the LV PMOSFET 40 and the ESD clamp unit 20. The LV PMOSFET 40 and the LV NMOSFET 42 receive the low voltage signal to turn on the ESD clamp unit 20 and switch the LV bias unit 26 to turn off the first HV NMOSFET 14 lest the ESD current damage the first HV NMOSFET 14.

The present invention applies to the HV open drain pad without using the HV PMOSFET. In other words, no extra mask layer is required to reduce the fabrication cost.

The operation of the first embodiment is described as below. In normal operation, a high voltage applies on the HV open drain pad. The first HV NMOSFET 14 receives the high voltage on the HV open drain pad to operate well. Meanwhile, the LV NMOSFET 32 uses the power-supply terminal VDD to turn off the second HV NMOSFET 30, so as to block the high voltage from the diode 16. Accordingly, no signal is transmitted to the LV trigger 24 whereby the LV trigger 24, the LV bias unit 26 and the ESD clamp unit 20 are disabled.

When an ESD event is applied to the HV open drain pad, the LV NMOSFET 32 and the parasitic drain-to-gate capacitor of the second HV NMOSFET 30 receive an ESD signal of the ESD event via the diode 16 to turn on the second HV NMOSFET 30, whereby the trigger signal is sent from the source of the HV second NMOSFET 30. Then, the capacitor 36 receives the trigger signal through the resistor 34 to establish the low voltage signal at the first electrode. The LV PMOSFET 40 and the LV NMOSFET 42 receive the low voltage signal to turn on the ESD clamp unit 20 and switch the LV bias unit 26 to turn off the first HV NMOSFET 14, whereby the ESD clamp unit 20 discharges the ESD current via the diode 16.

Figure 4:
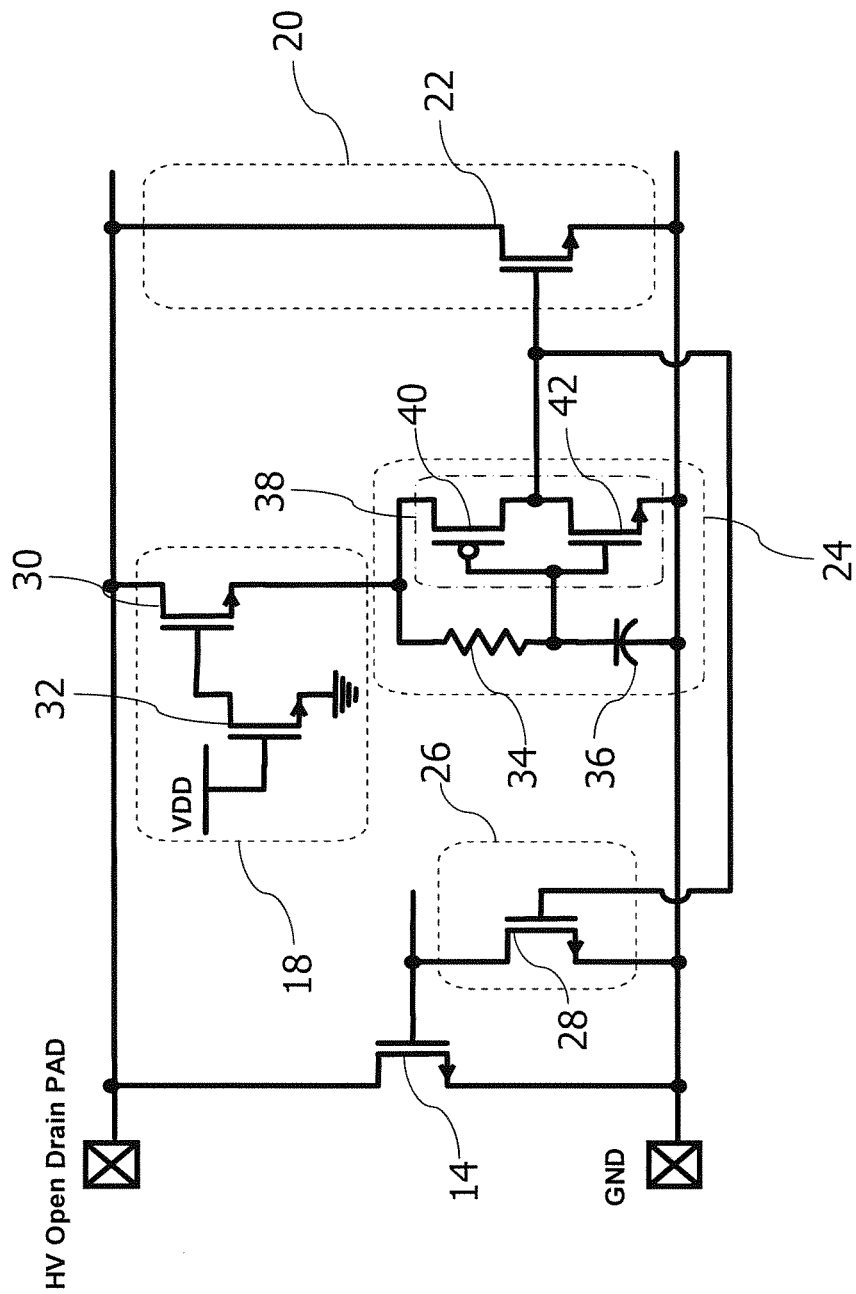
FIG. 4 is a circuit diagram schematically showing a high voltage open drain ESD protection device according to the second embodiment of the present invention.

The diode 16 is removed in single channel application, as shown in FIG. 4.

The second embodiment is introduced. Refer to FIG. 4. In the second embodiment, the second HV NMOSFET 30 is directly coupled to the HV open drain pad. In normal operation, a high voltage applies on the HV open drain pad. The first HV NMOSFET 14 receives the high voltage on the HV open drain pad to operate well. Meanwhile, the LV NMOSFET 32 uses the power-supply terminal VDD to turn off the second HV NMOSFET 30, so as to block the high voltage on the HV open drain pad. Accordingly, no signal is transmitted to the LV trigger 24 whereby the LV trigger 24, the LV bias unit 26 and the ESD clamp unit 20 are disabled.

When an ESD event is applied to the HV open drain pad the LV NMOSFET 32 and the parasitic drain-to-gate capacitor of the second HV NMOSFET 30 receive an ESD signal of the ESD event to turn on the second HV NMOSFET 30, whereby the trigger signal is sent from the source of the HV second NMOSFET 30. Then, the capacitor 36 receives the trigger signal through the resistor 34 to establish the low voltage signal at the first electrode. The LV PMOSFET 40 and the LV NMOSFET 42 receive the low voltage signal to turn on the ESD clamp unit 20 and switch the LV bias unit 26 to turn off the first HV NMOSFET 14, whereby the ESD clamp unit 20 discharges the ESD current.

In the abovementioned embodiments, no HV PMOS is used and no extra MASK layer for HV PMOS is required. In other words, the fabrication cost of the present invention is low.

In conclusion, the present invention only includes HV NMOS to achieve the low cost requirement.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A low-cost electrostatic discharge (ESD) protection device for high-voltage open-drain pad, comprising:
   a first high-voltage N-channel metal oxide semiconductor field effect transistor (HV NMOSFET) coupled to a high-voltage (HV) open drain pad and a low-voltage (LV) ground pad;

a diode coupled to said HV open drain pad, a high-voltage (HV) block unit and an electrostatic discharge (ESD) clamp unit, wherein said diode is used for multi-channel open drain application to share same said ESD clamp unit, and wherein said diode is removed in single channel application; and a low-voltage (LV) bias unit coupled to a gate of said first HV NMOSFET, a low-voltage (LV) trigger, and said LV ground pad, wherein said LV bias unit is disabled during normal operation, and said HV block unit is coupled to said ESD clamp unit and said LV trigger, blocks a high voltage from said diode during said normal operation and generates a trigger signal to said LV trigger when an ESD event is applied to said HV open drain pad, and said LV trigger is coupled to said HV block unit, said ESD clamp unit and said LV ground pad, wherein when said ESD event is applied to said HV open drain pad, said LV trigger turns on said ESD clamp unit to discharge an ESD current and switches said LV bias unit to turn off said first HV NMOSFET, wherein said LV trigger unit is disabled during said normal operation, and said ESD clamp unit is coupled to said HV block unit and said LV ground pad, wherein said ESD clamp unit is disabled during said normal operation.

2. The low-cost ESD protection device for high-voltage open-drain pad according to claim 1, wherein said LV trigger further comprises:

a resistor having a first terminal and a second terminal, wherein said first terminal is coupled to said HV block unit;

a capacitor having a first electrode and a second electrode, wherein said first electrode and said second electrode are respectively coupled to said second terminal and said LV ground pad, and wherein said capacitor receives said trigger signal through said resistor to establish a low voltage signal at said first electrode when said ESD event is applied to said HV open drain pad; and an inverter coupled to said first terminal, said second terminal, said first electrode, said second electrode, said HV block unit, said LV ground pad, said ESD clamp unit and said LV bias unit, and receiving said low voltage signal to turn on said ESD clamp unit and switch said LV bias unit to turn off said first HV NMOSFET.

3. The low-cost ESD protection device for high-voltage open-drain pad according to claim 2, wherein said inverter further comprises:

a low-voltage P-channel metal oxide semiconductor field oxide transistor (LV PMOSFET) with a gate thereof coupled to said second terminal and said first electrode, a source thereof coupled to said first terminal and said HV block unit; and a low-voltage N-channel metal oxide semiconductor field oxide transistor (LV NMOSFET) with a gate thereof coupled to said second terminal and said first electrode, a source thereof coupled to said second electrode, said ESD clamp unit, and said LV ground pad, and a drain thereof coupled to a drain of said LV PMOSFET and said ESD clamp unit, wherein said LV PMOSFET and said LV NMOSFET receive said low voltage signal to turn on said ESD clamp unit and switch said LV bias unit to turn off said first HV NMOSFET.

4. The low-cost ESD protection device for high-voltage open-drain pad according to claim 1, wherein said LV bias unit is a low-voltage N-channel metal oxide semiconductor field oxide transistor (LV NMOSFET).

5. The low-cost ESD protection device for high-voltage open-drain pad according to claim 2, wherein said HV block unit further comprises:

a second HV NMOSFET with a drain thereof coupled to said ESD clamp unit, said first HV NMOSFET and said HV open drain pad, and a source thereof coupled to said LV trigger; and a low-voltage N-channel metal oxide semiconductor field oxide transistor (LV NMOSFET) with a gate thereof coupled to a power-supply terminal, a source thereof coupled to a ground, and a drain thereof coupled to a gate of said second HV NMOSFET, wherein said LV NMOSFET turns off said second HV NMOSFET by a voltage of said power-supply terminal during normal operation, so as to block said high voltage.

6. The low-cost ESD protection device for high-voltage open-drain pad according to claim 5, wherein said second HV NMOSFET has a parasitic drain-to-gate capacitor between said drain and said gate of said second HV NMOSFET, and wherein when said ESD event occurs, said LV NMOSFET and said parasitic drain-to-gate capacitor turn on said second HV NMOSFET by receiving an ESD signal of said ESD event.

7. The low-cost ESD protection device for high-voltage open-drain pad according to claim 1, wherein said ESD clamp unit is a high-voltage N-channel metal oxide semiconductor field effect transistor (HV NMOSFET).

\* \* \* \* \*